(12) United States Patent
Achilli et al.

(10) Patent No.: US 8,801,934 B2
(45) Date of Patent: Aug. 12, 2014

(54) OSMOTICALLY-ASSISTED DESALINATION METHOD AND SYSTEM

(75) Inventors: Andrea Achilli, Reno, NV (US); Amy E. Childress, Reno, NV (US); Tzahi Y. Cath, Golden, CO (US)

(73) Assignees: Board of Regents of the Nevada System of Higher Education, on behalf of the Univeristy of Nevada, Reno, Reno, NV (US); Colorado School of Mines, Golden, CO (US)

( * ) Notice: Subject to any disclaimer, the term of this patent is extended or adjusted under 35 U.S.C. 154(b) by 540 days.

(21) Appl. No.: 13/211,204

(22) Filed: Aug. 16, 2011

(65) Prior Publication Data
US 2012/0037566 A1    Feb. 16, 2012

Related U.S. Application Data

(60) Provisional application No. 61/374,221, filed on Aug. 16, 2010.

(51) Int. Cl.
*B01D 61/00*    (2006.01)
*B01D 61/02*    (2006.01)

(52) U.S. Cl.
USPC ........................... 210/652; 210/641; 210/644

(58) Field of Classification Search
USPC ......................................... 210/641, 644, 652
See application file for complete search history.

(56) References Cited

U.S. PATENT DOCUMENTS

| | | | | |
|---|---|---|---|---|
| 6,468,431 | B1* | 10/2002 | Oklelas, Jr. | 210/652 |
| 6,797,173 | B1* | 9/2004 | Oklejas, Jr. | 210/652 |
| 7,608,188 | B2 | 10/2009 | Cath et al. | |
| 2006/0144789 | A1* | 7/2006 | Cath et al. | 210/641 |
| 2007/0181473 | A1* | 8/2007 | Manth et al. | 210/137 |
| 2010/0192575 | A1* | 8/2010 | Al-Mayahi et al. | 60/671 |

OTHER PUBLICATIONS

Aaberg, Rolf Jarle. "Osmotic power: A new and powerful renewable energy source?." *Refocus* 4.6 (2003): 48-50.
Achilli, et al., "Power generation with pressure retarded osmosis: an experimentaland theoretical investigation." *Journal of Membrane Science*, 343 (2009) 42-52.
Cath, et al., "Forward osmosis: Principles, applications, and recent developments." *Journal of Membrane Science*, 281 (2006) 70-87.
Fritzmann, et al. "State-of-the-art of reverse osmosis desalination." *Desalination* 216.1 (2007): 1-76.
Gerstandt, et al., "Membrane processes in energy supply for an osmotic power plant." *Desalination*, 224 (2008) 64-70.
Jellinek, et al. "Osmo-power. Theory and performance of an osmo-power pilot plant." *Ocean engineering* 8.2 (1981): 103-128.
Lee, et al. "Membranes for power generation by pressure-retarded osmosis." *Journal of Membrane Science* 8.2 (1981): 141-171.

(Continued)

*Primary Examiner* — Dirk Bass
(74) *Attorney, Agent, or Firm* — Klarquist Sparkman, LLP (57) ABSTRACT

Systems and methods for osmotically assisted desalination include using a pressurized concentrate from a pressure desalination process to pressurize a feed to the desalination process. The depressurized concentrate thereby produced is used as a draw solution for a pressure-retarded osmosis process. The pressure-retarded osmosis unit produces a pressurized draw solution stream that is used to pressurize another feed to the desalination process. In one example, the feed to the pressure-retarded osmosis process is impaired water.

16 Claims, 10 Drawing Sheets

(56) References Cited

OTHER PUBLICATIONS

Levenspiel, et al. "The Osmotic Pump in principle, but probably not in practice, fresh water can be extracted from our oceans for no expenditure of energy." *Science* 183.4121 (1974): 157-160.

Loeb, et al., "A two coefficient water transport equation for pressure-retarded osmosis." *Journal of Membrane Science*, 4 (1979) 351-362.

Loeb, et al., "Osmotic power plants." *Science*, 189 (1975) 654-655.

Loeb, et al., "Production of energy from concentrated brines by pressure-retarded osmosis, II. Experimental results and projected energy costs." *Journal of Membrane Science*, 1 (1976) 249-269.

Loeb, Sidney. "Production of energy from concentrated brines by pressure-retarded osmosis: I. Preliminary technical and economic correlations." *Journal of Membrane Science* 1 (1976): 49-63.

Mehta, et al., "Performance of permasep B-9 and B-10 membranes in various osmotic regions and at high osmotic pressures." *Journal of Membrane Science*, 4 (1979) 335-349.

Mehta, et al., "Internal polarization in the porous substructure of a semipermeable membrane under pressure-retarded osmosis." *Journal of Membrane Science*, 4 (1978) 261-265.

Norman, Richard S. "Water salination: a source of energy." *Science* 186.4161 (1974): 350-352.

Shannon, et al. "Science and technology for water purification in the coming decades." *Nature* 452.7185 (2008): 301-310.

Skilhagen, et al., "Osmotic power—power production based on the osmotic pressure difference between waters with varying salt gradients." *Desalination*, 220 (2008) 476-482.

Statkraft Press Centre, Crown princess of Norway to open the world's first osmotic power plant 2009, available at http://www.statkraft.com/presscentre/press-releases/crown-princess-mette-marit-to-open-the-worlds-first-osmotic-powerplant.aspx; last accessed Apr. 1, 2014.

Thorsen et al., "Finding hidden energy in membrane processes." *Filtration & Separation*, 42 (2005) 28-30.

Thorsen et al., "The potential for power production from salinity gradients by pressure retarded osmosis." *Journal of Membrane Science*, 335 (2009) 103-110.

U.S. Energy Information Administration, http://www.eia.doe.gov; Last accessed on Apr. 1, 2014.

* cited by examiner

OSMOTICALLY-ASSISTED DESALINATION METHOD AND SYSTEM

CROSS-REFERENCE TO RELATED APPLICATION

This application claims the benefit of priority of U.S. Provisional Application No. 61/374,221, filed Aug. 16, 2011, which is herein incorporated by reference in its entirety.

STATEMENT OF GOVERNMENT SUPPORT

This invention was made with United States Government support under a grant from the United States Department of Energy, Grant No. DE-FG02-05ER64143. The United States Government has certain rights in the invention.

FIELD

This disclosure pertains to liquid-treatment apparatus and methods. In particular examples, the present disclosure provides a method and apparatus usable for producing purified water along with electrical or mechanical energy.

BACKGROUND

As the demand for water constantly grows, the water industry is embracing advanced water treatment processes for the desalination of saline water, such as seawater or brackish water, and reclamation of impaired water, such as wastewater and drainage water. Some processes that have been used to desalinate water are membrane processes such as reverse osmosis, nanofiltration, and electrodialysis, or thermal distillation. Microfiltration and ultrafiltration membrane processes are being increasingly used for surface water and wastewater treatment.

Water recovery is a major economic parameter of drinking water production. However, this parameter is typically limited in existing membrane desalination processes. In addition to limited water recovery, another drawback is that these processes are typically considered energy intensive. Membrane based systems can suffer from additional problems. For example, membrane fouling and scaling in pressure-driven membrane processes (e.g., in reverse osmosis, nanofiltration, ultrafiltration, and microfiltration) are often a major area of concern, as they can increase the cost of operating and maintaining the systems. Pretreatment of the feed water is a way of reducing fouling and scaling, but is typically expensive. An additional drawback of most membrane-based systems is that increased salt content of the feed stream typically reduces the flux of product water due to the lower osmotic potential difference between the feed solution and the permeate.

Seawater desalination has become a common practice to supply the growing demand for water in areas having access to the ocean. Shortage of portable (drinking) water in inland areas pose much more complicated challenges to water authorities, governments, and other stakeholders. Inland regions are restricted to the use of surface water, groundwater, and/or reclaimed water.

Most wastewater treatment plants use combinations of physical, biological, and chemical processes to treat wastewater before discharge to the environment or beneficial reuse. These processes have high operating and maintenance (O&M) costs, including energy and chemicals.

SUMMARY

In one embodiment, the present disclosure provides a method for osmotically assisted desalination. A first solute stream, optionally obtained from a first saline water source, can be passed through a low pressure inlet of a first pressure exchanger, producing a pressurized first solute stream discharged from a high pressure outlet of the first pressure exchanger. The pressurized first solute stream can be optionally passed through a booster pump. The pressurized first solute stream can then be passed through an inlet of a pressure desalination unit to produce a stream of desalinated water and a pressurized concentrate stream.

The pressurized concentrate stream can pass through a high pressure inlet of the first pressure exchanger to produce a depressurized concentrate stream discharged from a low pressure outlet of the first pressure exchanger. In the first pressure exchanger, pressure from the pressurized concentrate stream can be transferred to the incoming first solute stream to produce the pressurized first solute stream.

The depressurized concentrate stream from the first pressure exchanger can be passed into the draw solution side of a pressure-retarded osmosis unit. A stream of water having lower osmotic potential than the depressurized concentrate stream, such as impaired water, can be passed into the feed side of the pressure-retarded osmosis unit. In the pressure-retarded osmosis unit, water from the impaired water (or other lower osmotic potential water) can cross a membrane and enters the depressurized concentrate stream, producing a pressurized diluted draw solution stream. A concentrated stream, from the now concentrated lower osmotic potential stream, can be discharged from an outlet of the pressure-retarded osmosis unit.

Optionally, lower osmotic potential water, such as impaired water, can be obtained from a suitable source, such as an impaired water source, prior to being transferred to the pressure-retarded osmosis unit. In some examples, a low pressure pump can be located downstream of the source and upstream from the pressure-retarded osmosis unit inlet for the lower osmotic potential water source, or can be located downstream of the pressure-retarded osmosis unit concentrated impaired water outlet. The low pressure pump can be used for pushing or pulling, depending on its location, the lower osmotic potential water through the pressure-retarded osmosis unit.

After leaving the pressure-retarded osmosis unit, the pressurized diluted draw solution stream can be passed through a high pressure inlet of a second pressure exchanger. A second solute stream can be passed through a low pressure inlet of the second pressure exchanger. In some implementations, the second saline stream can be obtained from a second saline source. In more particular examples, the first and second saline sources are the same. In other examples, the first and second saline sources are different. In the second pressure exchanger, pressure can be transferred from the pressurized diluted draw solution stream to the second solute stream, producing a pressurized second solute stream discharged from a high pressure outlet of the second pressure exchanger. Depressurized diluted draw solution can be discharged from a low pressure outlet of the second pressure exchanger. In one example, the diluted draw solution can be discharged into a body of water, such as the ocean or an aquifer. The pressurized second solute stream can be passed through an inlet of the pressure desalination unit.

In another embodiment, the present disclosure provides a desalination system. The desalination system includes a first pressure exchanger having a high pressure inlet, a low pressure inlet, a high pressure outlet, and a low pressure outlet. A pressure-retarded osmosis unit can be also included in the system. The pressure-retarded osmosis unit includes a feed inlet, a feed outlet, a draw solution inlet, and a draw solution outlet. The draw solution inlet can be coupled to the low pressure outlet of the first pressure exchanger. The pressure-retarded osmosis unit includes a pressure vessel and, in some examples, and a membrane.

The system further includes a second pressure exchanger having a high pressure inlet, a low pressure inlet, a high pressure outlet, and a low pressure outlet. The high pressure inlet is coupled to the draw solution outlet of the pressure-retarded osmosis unit. A pressure desalination unit can be also included in the system. The pressure desalination unit has an inlet and an outlet. The inlet can be coupled to the high pressure outlets of the first and second pressure exchangers. Purified water, such as desalinated water, can be discharged from the outlet of the pressure desalination unit. In one example, the pressure desalination unit can be a reverse osmosis unit and can include a suitable reverse osmosis membrane.

In some implementations, the system includes a booster pump coupled intermediate the high pressure outlet of the first pressure exchanger and the inlet of the pressure desalination unit. In another implementation, the system includes a low pressure pump in communication with the feed inlet or feed outlet of the pressure-retarded osmosis unit.

The system includes additional components in some implementations. In various such implementations, the system includes one or more of a first saline water source coupled to the low pressure inlet of the first pressure exchanger, a second saline water source coupled to the low pressure inlet of the second pressure exchanger, and a low osmolality water source coupled to the feed inlet of the pressure-retarded osmosis unit.

The disclosed system and method can provide a number of advantages. Osmotically assisted desalination uses a pressure desalination process, such as reverse osmosis, in combination with a pressure-retarded osmosis subsystem. The system and method can desalinate water at lower energy expenditure than typical existing processes. The process and system can also provide efficient treatment, such as concentration, of impaired water. Dilution of concentrate by the pressure desalination can reduce discharge of pollutants to the environment. The method and system also provide separation between impaired water and desalinated water produced by the process, such as portable water for human consumption. The public may find water produced from impaired water to be unappetizing. In the disclosed system and process, the water to be consumed is produced from a saline water source, such as seawater or brackish water.

There are additional features and advantages of the various embodiments of the present disclosure. They will become evident from the following disclosure.

In this regard, it is to be understood that this is a brief summary of the various embodiments described herein. Any given embodiment of the present disclosure need not provide all features noted above, nor must it solve all problems or address all issues in the prior art noted above.

BRIEF DESCRIPTION OF THE DRAWINGS

The description herein makes reference to the accompanying drawings wherein like reference numerals refer to like parts throughout the several views, and wherein.

DETAILED DESCRIPTION

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, or including A and B. All numerical ranges given herein include all values, including end points (unless specifically excluded) and any and all intermediate ranges between the endpoints. Further, the term "coupled" generally means electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed methods may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment or example are not limited to that embodiment or example, and can be applied, in whole or in part, to any embodiment or example disclosed herein.

As used herein, "seawater" (sometimes abbreviated "SW") is saline water from the ocean, sea, or a similar body of water. In some examples, seawater can refer to water that does not originate from a naturally saline body of water, but has an osmolality similar thereto.

"Brackish water" (sometimes abbreviated "BW"), as used herein, is saline water that has salt concentrations lower than seawater. In some examples, brackish water is obtained from groundwater, surface water sources, or diluted seawater. In further examples, brackish water does not come from a naturally occurring source, but has an osmolality similar to a naturally occurring brackish water.

"Brine" is saline water that has salt concentration higher than seawater and it is typically a byproduct of a water desalination processes having a higher concentration of a solute or other material than the feed water. In some examples, brine is used as a draw solution for forward osmosis, such as pressure-retarded osmosis.

As used herein, "impaired water" is any water that does not meet portable water quality standards.

The terms "upstream" and "downstream" are used herein to denote, as applicable, the position of a particular component, in a hydraulic sense, relative to another component. For example, a component located upstream of a second component is located so as to be contacted by a hydraulic stream (flowing in a conduit for example) before the second component is contacted by the hydraulic stream. Conversely, a component located downstream of a second component is located so as to be contacted by a hydraulic stream after the second component is contacted by the hydraulic stream. Unless otherwise clearly indicated, when components are arranged in a loop, upstream and downstream are determined with respect to a particular starting point in the loop in a single circuit around the loop such that a particular component will not be both upstream and downstream, simultaneously, from another particular component.

Forward Osmosis

Forward-osmosis processes are also sometimes referred to as simply "osmosis" or as "direct osmosis." Forward-osmosis typically uses a semipermeable membrane having a permeate side and a feed side. The feed (active) side contacts the water (feed water) to be treated. The permeate (support), or draw solution, side contacts a hypertonic solution, referred to as an osmotic agent or a draw solution or receiving stream, that serves to draw (by osmosis) water molecules and certain solutes and other compounds from the feed water through the membrane into the draw solution. The draw solution is circulated on the permeate (draw solution) side of the membrane as the feed water is passed by the feed side of the membrane.

Unlike reverse osmosis, which uses a pressure differential across the membrane to induce mass-transfer across the membrane from the feed side to the permeate side, forward-osmosis uses an osmotic pressure difference as the driving force for mass transfer across the membrane. As long as the osmotic potential of water on the permeate side (draw solution side) of the membrane is lower than the osmotic potential of water on the feed side, water will diffuse from the feed side through the membrane and thereby dilute the draw solution. To maintain its effectiveness in the face of this dilution, the draw solution must typically be re-concentrated, or otherwise replenished, during use. This re-concentration typically consumes most of the energy that conventionally must be provided to conduct a forward-osmosis process.

Because the semipermeable membranes used in forward-osmosis are typically similar to the membranes used in reverse osmosis, most contaminants are rejected by the membrane and only water and some small molecules diffuse through the membrane to the draw solution side. A contaminant that is "rejected" is prevented by the membrane from passing through the membrane. Selecting an appropriate membrane usually involves selecting a membrane that exhibits high rejection of salts as well as various organic and/or inorganic compounds while still allowing a high flux of water through the membrane at a low driving force.

Other advantages of the forward-osmosis process can include relatively low propensity to membrane fouling, low energy consumption, simplicity, and reliability. Because operating pressures in the forward-osmosis process typically are very low (up to a few bars, reflective of the flow resistance exhibited by the housing containing the membranes), the equipment used for performing forward-osmosis can be very simple. Also, use of lower pressure may alleviate potential problems with membrane support in the housing and reduce pressure-mediated fouling of the membrane.

Pressure-Retarded Osmosis

Pressure-retarded osmosis (PRO) uses the forward osmosis principle as a basis for its operation. As in forward-osmosis, pressure-retarded osmosis typically uses a semipermeable membrane having a permeate side and a feed side. The feed water to be treated flows on the active side of the membrane and a hypertonic draw solution having osmotic pressure higher than the feed solution flows on the support (porous) side of the membrane. In pressure-retarded osmosis the draw solution is at elevated hydraulic pressure, lower than the osmotic pressure difference between the feed and the draw solution streams. In PRO water diffuses from the feed side through the membrane and thereby producing a net increase of water volume ($\Delta V$) on the permeate side of the membrane; being incompressible, $\Delta V$ induces increase in hydraulic pressure on the support side. To recover beneficial energy, the water that diffused through the membrane is typically depressurized in a turbogenerator or similar device. During the process, the draw solution gets diluted and the feed solution gets concentrated and consequently the driving force for further water diffusion is diminished. To maintain the process effectiveness, the draw solution needs to be continuously replenished. The replenished draw solution can be any hypertonic liquid, including seawater, concentrate from seawater desalination processes, or any other saline sources or brines.

Water flux in pressure-retarded osmosis is typically lower than water flux during forward osmosis and it is a function of the hydraulic pressure induced on the draw solution side. The optimal hydraulic pressure at which the system should operate is the one that maximize the power output, and it is a function of the osmotic pressures of the feed and draw solution streams, and the membrane characteristics.

The membranes and purification process in pressure-retarded osmosis, forward osmosis, and reverse osmosis are similar; most contaminants are rejected by the membrane and only water and small molecules will diffuse through the membrane to the draw solution side. Solute from the draw solution may diffuse in the reverse direction into the feed solution. A contaminant that is "rejected" is prevented by the membrane from passing through the membrane. Selecting an appropriate membrane usually involves selecting a membrane that exhibits high rejection of salts as well as various organic and/or inorganic compounds while still allowing a high flux of water through the membrane at a low driving force.

Reverse Osmosis

Reverse osmosis (RO) is a separation process that uses pressure to force a solution through a membrane that retains the solute on one side and allows the pure solvent to pass to the other side. This is the reverse of the normal osmosis process, which is the natural movement of solvent from an area of low solute concentration, through a membrane, to an area of high solute concentration when no external pressure is applied. Reverse osmosis membranes are typically semipermeable and allow the passage of solvent but not of solute.

The membranes used for reverse osmosis have a dense barrier layer in the polymer matrix where the separation occurs. In most cases the membrane is designed to allow only water to pass through this dense layer while preventing the passage of solutes (such as salt ions). This process typically requires that a high pressure be exerted on the high concentration side of the membrane, usually 2-17 bar (30-250 psi) for fresh and brackish water, and 40-70 bar (600-1000 psi) for seawater, which has approximately 24 bar (350 psi) natural osmotic pressure which must be overcome.

Due to the high pressure required for desalination of highly saline water (e.g., seawater or concentrated brine from brackish water), high-pressure membrane desalination processes are considered energy intensive. In most desalination plants, energy recovery devices are used to recover hydraulic energy stored in the discharged brine (concentrate). Yet, the chemical energy associated with the brine is commonly not recovered. In addition, discharge of the brine into bodies of water can raise environmental concerns.

Osmotically Assisted Desalination

Figure 1:
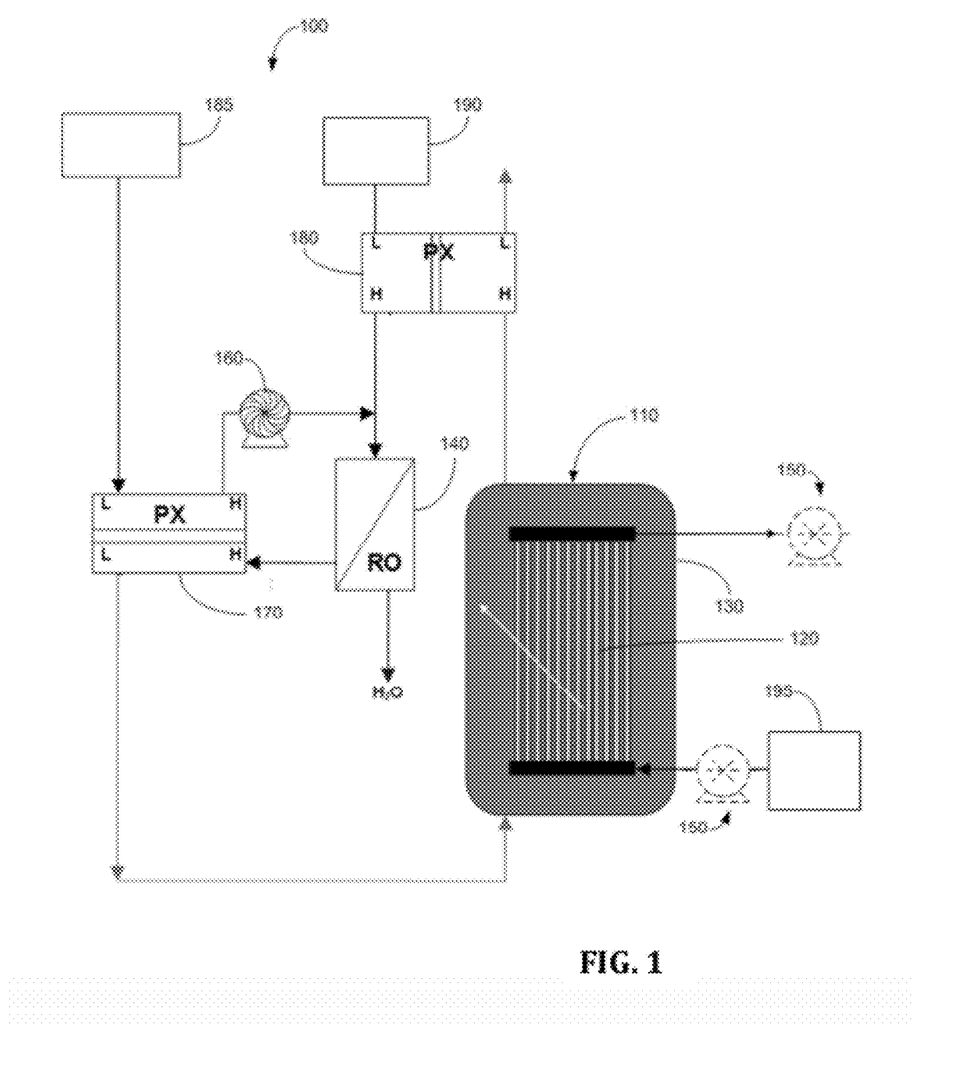
FIG. 1 is a schematic hydraulic diagram of an osmotically assisted desalination system according to an embodiment of the present disclosure.

A system 100 for carrying out osmotically assisted desalination is shown in FIG. 1. The system 100 includes a pressure-retarded osmosis unit 110 having a forward osmosis/PRO membrane 120 and a membrane vessel 130. The pressure-retarded osmosis membrane module 110 has, in some implementations, a spiral wound configuration or a tubular configuration. In other implementations, the pressure-retarded osmosis unit 110 has another configuration.

The system 100 also includes a pressure driven desalination/concentration unit 140. In one example, the desalination unit 140 is a reverse osmosis unit. In other examples, the desalination unit 140 is an ultrafiltration unit or a nanofiltration unit. The system 100, optionally, has a low-pressure pump 150, located proximate the inlet or outlet of the pressure-retarded osmosis unit 110, and a booster pump 160. The system can also include one or more energy recovery devices, such as pressure exchangers or turbochargers. FIG. 1 illustrates first and second pressure exchangers 170, 180.

A number of possible membranes and membrane units can be utilized. The membranes are desirably semi-permeable. Preferably, the membrane(s) have a water permeability coefficient greater than 1.5×10-9 (m/s)/kPa, salt permeability coefficient smaller than 1.5×10-7 m/s, and a structural parameter smaller than 1 mm. Furthermore, membranes can preferably sustain hydraulic pressures up to 5000 kPa (725 psi), but higher pressure is also acceptable. Membranes can be assembled in different configurations, including but not limited to hollow-fiber, capillary, tubular, and flat sheet (e.g., plate-and-frame or spiral-wound). Membrane modules preferably allow for fluid circulation on both sides of the membrane with velocities greater than 0.001 m/s and pressure drops smaller than about 100 kPa per meter (meter length of feed channel or DS channel).

In particular implementations, the pressure exchangers 170, 180 are liquid-liquid pressure exchangers. That is, high pressure input fluid transfers its pressure to a low pressure input fluid. In doing so, the low pressure input fluid becomes pressurized to form a high pressure output fluid. The high pressure input fluid becomes depressurized to form a low pressure output fluid. Suitable pressure exchangers include rotary pressure exchangers, such as those available from Energy Recovery Inc., of San Leandro, Calif. ("ERI"). Suitable ERI models include the PX 65, PX 4S, and PX-300 series of pressure exchangers.

In further implementations, the pressure exchangers 170, 180 use a high pressure input fluid to drive a turbine or similar mechanism, such as to drive a pump, to produce a low pressure output fluid and mechanical work. The mechanical work can be used, for example, to drive a pump that pressurizes a low pressure input fluid to produce a high pressure output fluid.

The system 100 can include additional components, such as pretreatment units (not shown) for feeds to the pressure-retarded osmosis unit 110, the first pressure exchanger 170, or the second pressure exchanger 180. In further implementations, the system 100 includes a component (not shown) to further treat concentrated impaired water leaving the pressure-retarded osmosis unit 110.

Figure 2:
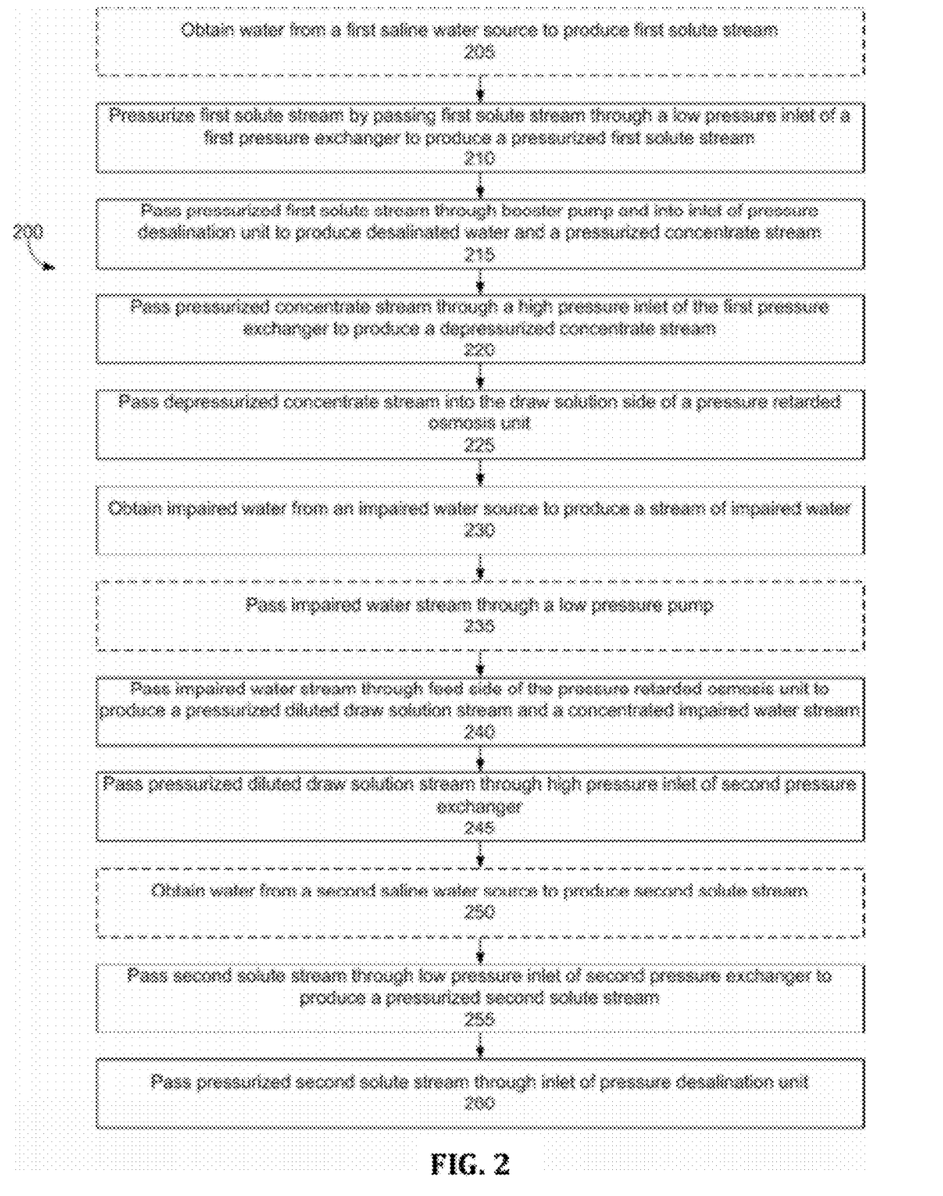
FIG. 2 is a flowchart of an osmotically assisted desalination method according to an embodiment of the present disclosure.

FIG. 2 illustrates a process 200 for carrying out osmotically assisted desalination, such as using the system 100. In optional step 205, water is obtained from a first saline water source 185 to provide a first solute stream. The saline water source can be, for example, seawater, brackish water, or saline water produced by another industrial process. The first solute stream is pressurized in step 210 by passing the first solute stream through a low pressure inlet of a first pressure exchanger, such as pressure exchanger 170 (FIG. 1). The first solute stream thus becomes pressurized by the first pressure exchanger to become a pressurized first solute stream.

Optionally, the pressurized first solute stream passes through a booster pump, such as pump 160 (FIG. 1), in step 215. Also in step 215, after optionally leaving the booster pump, the pressurized first solute stream is passed through the inlet of a pressure desalination unit, such as a reverse osmosis unit, in step 215. In other examples, rather than a reverse osmosis unit, the pressure desalination unit is a nanofiltration unit or an ultrafiltration unit. In one example, the pressure desalination unit is the pressure desalination unit 140 of FIG. 1. Step 220 produces desalinated water and a pressurized concentrate stream. The desalinated water, in some examples, is portable water.

In step 220, the pressurized concentrate stream is passed through a high pressure input of the first pressure exchanger to produce a depressurized concentrate stream. The pressure originally in the pressurized concentrate stream is transferred by the first pressure exchanger 170 to the first solute stream (step 210). The depressurized concentrate stream from step 220 is passed into the draw solution side of a pressure-retarded osmosis unit, such as unit 110 (FIG. 1), in step 225.

In optional step 230, impaired water is obtained from an impaired water source 195, such as municipal wastewater, to produce an impaired water stream. The impaired water stream may be passed through a low pressure pump (e.g., pump 150) in optional step 235. The impaired water stream is passed through the feed side of the pressure-retarded osmosis unit 110 in step 240. Water from the impaired water stream crosses a membrane (e.g., membrane 120) in the pressure-retarded osmosis unit, diluting and pressurizing the incoming depressurized concentrate stream. Step 240 produces a concentrated impaired water stream and a pressurized diluted draw solution stream. In some examples, rather than having a low pressure pump act on the incoming impaired water stream in optional step 235, the low pressure pump acts on the outgoing concentrated impaired water stream.

The pressurized diluted draw solution stream is passed through the high pressure inlet of a second pressure exchanger, such as pressure exchanger 180 of FIG. 1, in step 245. In optional step 250, water is obtained from a second saline water source 190 to produce a second solute stream. In step 255, a second solute stream is passed through the low pressure inlet of the second pressure exchanger 180. The second solute stream, in some examples, includes seawater, brackish water, or saline water produced from an industrial process. The second solute stream, in one example, comes from the same source as the first solute stream. In another example, the first and second solute streams are from different sources. Passing the second solute stream through the second pressure exchanger produces a pressurized second solute stream and a depressurized diluted draw solution stream. In some examples, the depressurized draw solution stream is discarded after step 255, such as by discharge into the ocean, waterway, aquifer, etc.

In step 260, the pressurized second solute stream is passed through an inlet of the pressure desalination unit (e.g., desalination unit 140). In some examples, the pressurized second solute stream and pressurized first solute stream (step 210) are combined before entering the pressure desalination unit as shown in FIG. 1. In other examples, the first and second solute streams enter the pressure desalination unit through separate inlets or are sequentially admitted through the same inlet.

The disclosed system and method can have a number of advantages. In some examples, the only, or primary, external energy input is used to power a booster pump (pump 160, FIG. 1) or low pressure pump (pump 150, FIG. 1) rather than pumping water from low atmospheric pressure to the ultimate target pressure as in conventional reverse osmosis systems.

The remaining energy is supplied by two, or more, pressure exchangers that recover the hydraulic pressure generated by the pressure-retarded osmosis subsystem and transfer it in the desalination subsystem.

In the disclosed system and method, the draw solution is typically used in a completely open loop, and therefore accumulation of contaminants in the system is unlikely. The brine generated during the desalination subsystem is diluted in the pressure-retarded osmosis subsystem. Thus, effluent from the disclosed system and method is typically less problematic to dispose of. For example, when discharged into the ocean, the effluent is at approximately the same ambient concentration; therefore mitigating adverse environmental impacts on marine ecology/habitat. Furthermore, being mixed with purified water from the pressure-retarded osmosis subsystem, the diluted brine is discharged to the ocean at higher water quality compared to the ambient seawater.

The disclosed method and system can also act as high-level wastewater treatment of a wide range of waste streams, when such streams are used as the low osmolality feed for the pressure-retarded osmosis subsystem.

Figure 3:
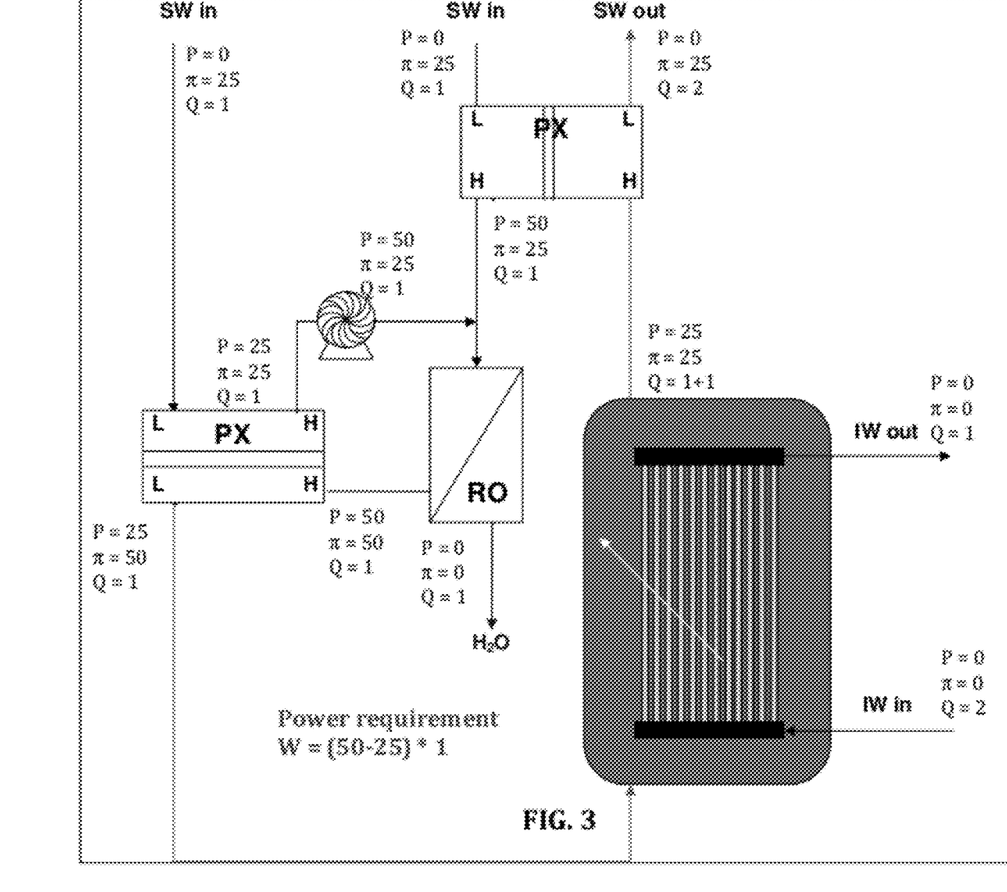
FIG. 3 is a schematic hydraulic diagram of an osmotically assisted desalination system according to an embodiment of the present disclosure with example balances of pressures and flows.

FIG. 3 illustrates a portion of the system of FIG. 1 showing the pressure (P) and osmotic pressure ($\pi$) of various streams. Preliminary operating cost analysis of an osmotically assisted desalination (OAD) system was performed and compared to conventional RO systems (including PX recovery). The simulation calculations were performed using results from our laboratory scale PRO data, as described in Achilli, A., "Osmotically-Driven Membrane Processes for Water Reuse and Energy Recovery" Ph.D. Dissertation, University of Nevada, Reno, 2009, incorporated by reference herein in its entirety. Operating costs of the OAD system and conventional RO system are reported in Table 1. $Q_{RO}$ is the permeate flowrate from RO, $Q_{PRO}$ is the permeate flowrate through PRO, Power is the system power requirement and Specific Energy is the energy required to produce 1 m$^3$ of drinking water. IW refers to impaired water.

TABLE 1

Power and specific energy comparison between RO and OAD systems

| $Q_{RO}$ m$^3$/d | $Q_{PRO}$ m$^3$/d | Power kW | Specific Energy kWh/m$^3$ | % Energy Reduction |
|---|---|---|---|---|
| 1 | 0 | 0.0579 | 1.390 | 0.00 |
| 1 | 0.5 | 0.0458 | 1.099 | 20.90 |
| 1 | 1 | 0.0362 | 0.869 | 37.48 |
| 1 | 1.5 | 0.0275 | 0.660 | 52.50 |
| 1 | 2 | 0.0193 | 0.463 | 66.67 |

The first row of the table illustrates the power and specific energy required to produce 1 m$^3$/d with a conventional RO system. The lower 4 rows illustrate the power and specific energy required to produce 1 m$^3$/d with the OAD system with increasing flowrates through the PRO membranes. Increasing PRO flowrates decreases power and energy requirements of the OAD system, because the PRO process is designed to produce energy. In a practical scenario, with an equal flowrate through RO and PRO, the OAD system requires 37% less specific energy than an RO system.

The following Example is provided to illustrate certain particular features and/or embodiments. This Example should not be construed to limit the invention to the particular features or embodiments described.

EXAMPLE

Figure 4:
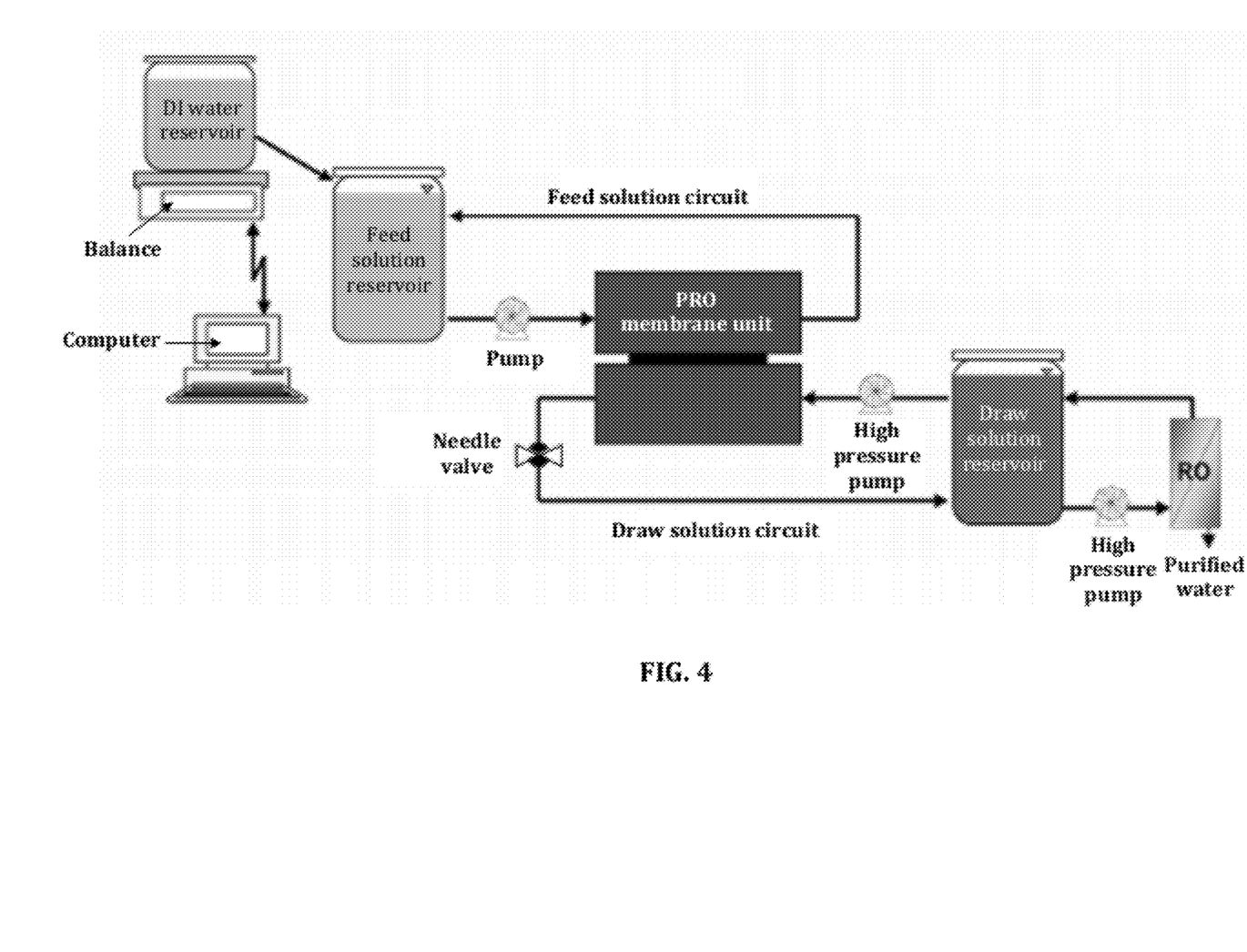
FIG. 4 is a schematic diagram of a pressure-retarded osmosis system.
Figure 5A:
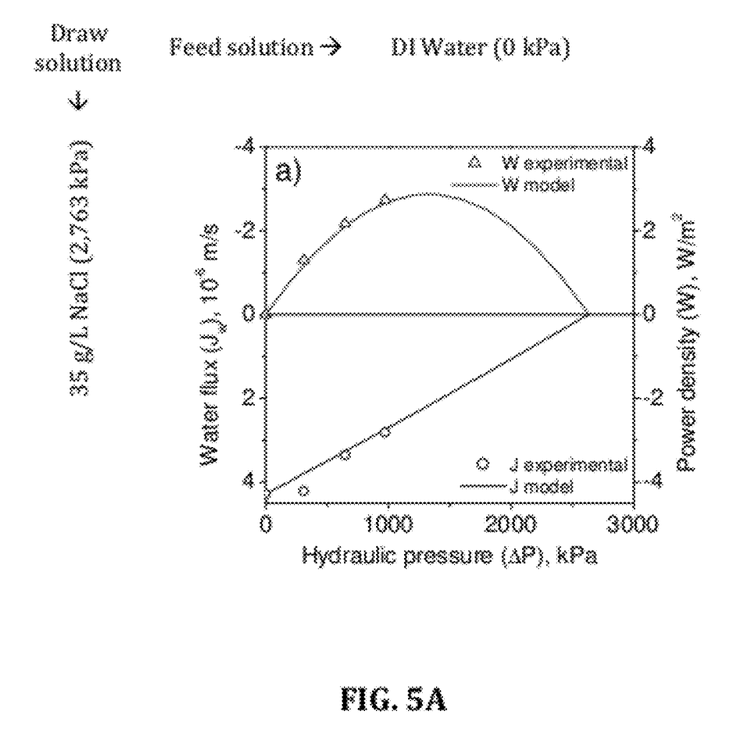
FIGS. 5A-F are graphs of water flux ($10^{-6}$ m/s) versus hydraulic pressure (kPa) for various conditions using a model and an example pressure-retarded osmosis system.
Figure 5B:
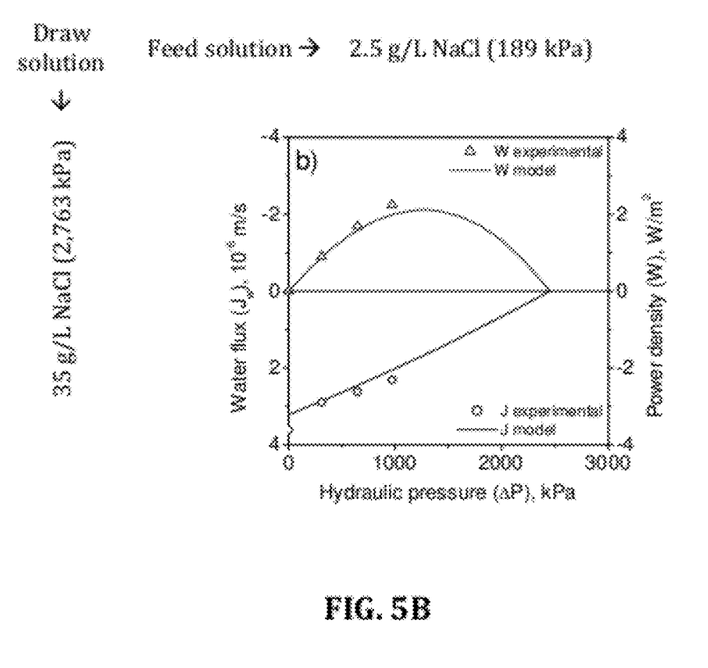
Figure 5C:
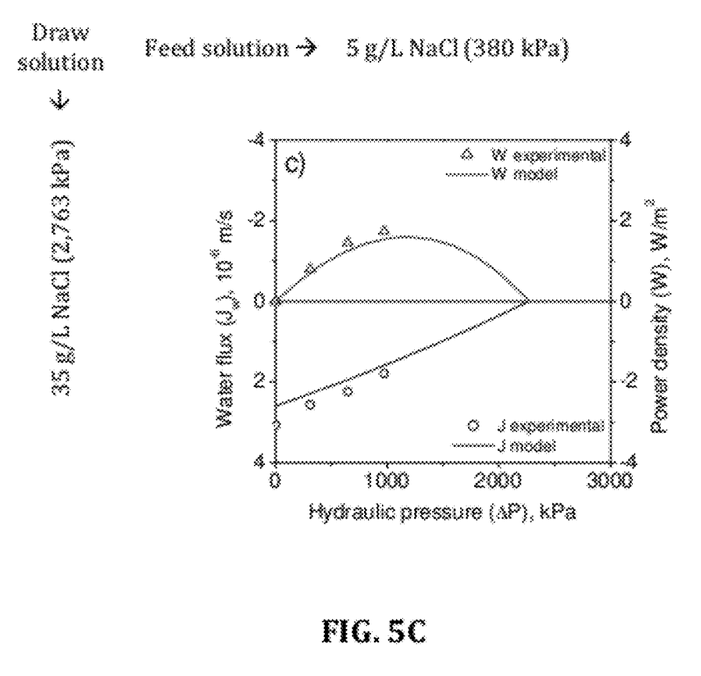
Figure 5D:
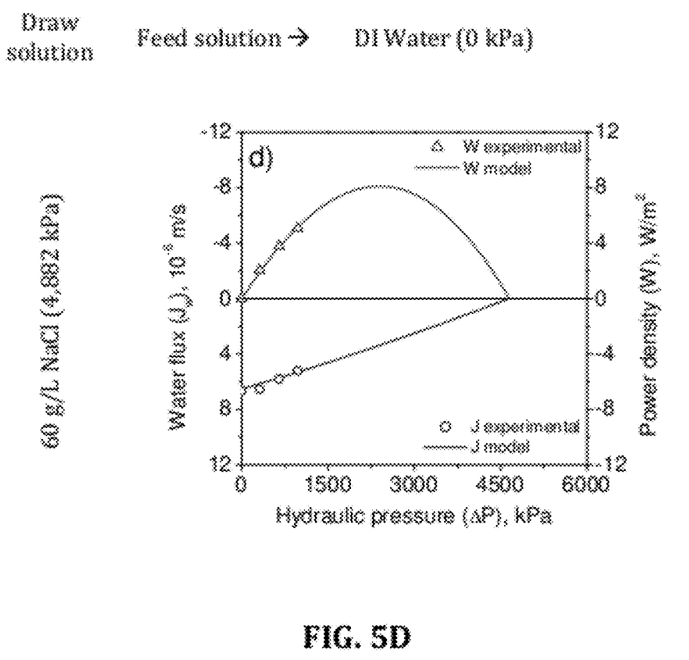
Figure 5E:
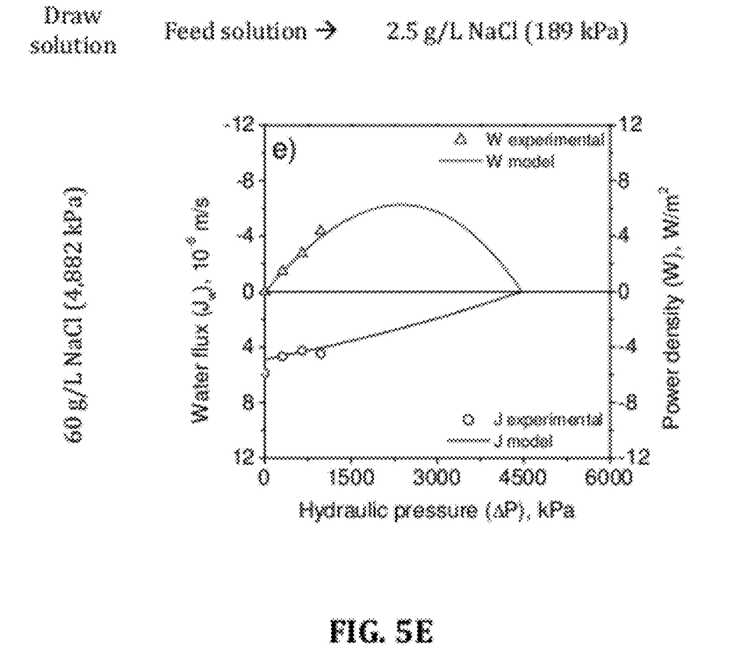
Figure 5F:
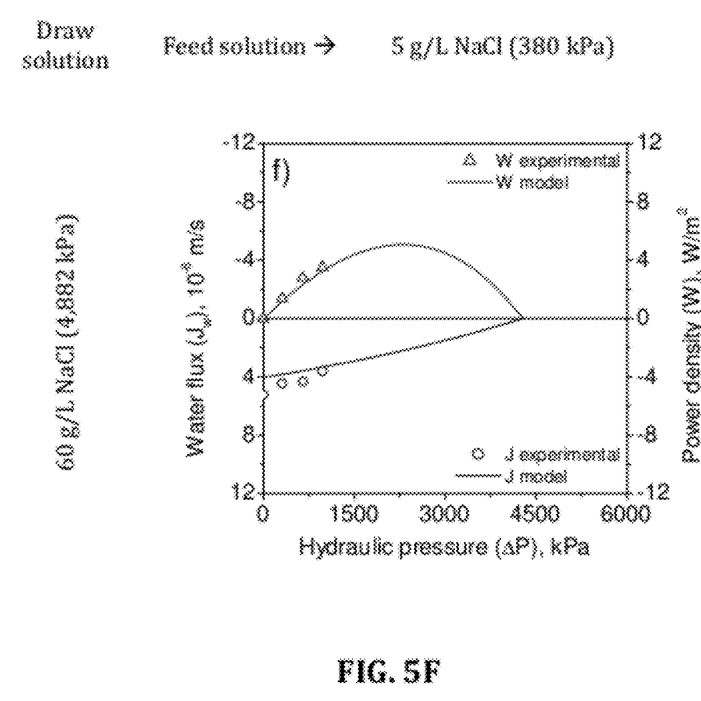

A schematic drawing of a flat-sheet bench-scale pressure-retarded osmosis system is shown in FIG. 4. The custom-made membrane module had symmetric channels on both sides of the membrane. This allowed for both the feed and draw solutions to flow tangentially to the membrane. The channel was 75 mm long, 25 mm wide, and 2.5 mm deep; with an effective membrane area of 18.75 cm$^2$. Mesh spacers were placed in both channels to support the membrane and enhance the turbulence in both streams. A variable-speed gear pump (Cole-Palmer, Vernon Hills, Ill.) was used to recirculate the feed solution at 0.5 L/min. A high-pressure positive displacement pump (Wanner Engineering Inc., Minneapolis, Minn.) was used to recirculate the draw solution at 0.5 L/min.

The feed solution was contained in a 5.4-L constant-level reservoir; the volume was kept constant by a float valve and deionized (DI) water continuously replenished the water that crossed the membrane. The DI water reservoir was placed on an analytical balance linked to a computer that collected data continuously. Flux through the membrane was calculated based on the change of weight of water in the DI water reservoir. Hydraulic pressures on the feed and draw solutions were monitored and recorded. The hydraulic pressure of the draw solution loop was controlled with a needle valve. The draw solution concentration was held constant by continuous reconcentration with a pilot-scale reverse osmosis subsystem. The reverse osmosis subsystem is described in Cath, et al., *Journal of Membrane Science* 257:85-98 (2005), incorporated by reference herein.

Pressure-retarded osmosis performance tests were conducted with the dense layer of the membrane facing the draw solution. A matrix of conditions were studied (Table 2). Three feed solution concentrations (0, 2.5, and 5 g/L NaCl) and two draw solution concentrations (35 and 60 g/L NaCl) were used. The hydraulic pressure of the feed solution was 30 kPa and three draw solution hydraulic pressures (340, 680, and 1000 kPa) were studied, resulting in $\Delta P$ values of 310, 650, and 970. Additionally, a forward osmosis runs were carried out with both feed and draw solution hydraulic pressures of 30 kPa ($\Delta P=0$). Each set of conditions was carried out for 12 hours and the temperature of the system was held constant at 24±1° C.

TABLE 2

Pressure-retarded osmosis conditions

| $C_{Feed}$ g/L NaCl | $C_{DS}$ g/L NaCl | $\Delta P$ kPa |
|---|---|---|
| 0 | 35 | 0 |
| 0 | 35 | 310 |
| 0 | 35 | 650 |
| 0 | 35 | 970 |
| 2.5 | 35 | 0 |
| 2.5 | 35 | 310 |
| 2.5 | 35 | 650 |
| 2.5 | 35 | 970 |
| 5.0 | 35 | 0 |
| 5.0 | 35 | 310 |
| 5.0 | 35 | 650 |
| 5.0 | 35 | 970 |
| 0 | 60 | 0 |
| 0 | 60 | 310 |
| 0 | 60 | 650 |
| 0 | 60 | 970 |
| 2.5 | 60 | 0 |
| 2.5 | 60 | 310 |
| 2.5 | 60 | 650 |
| 2.5 | 60 | 970 |
| 5.0 | 60 | 0 |
| 5.0 | 60 | 310 |
| 5.0 | 60 | 650 |
| 5.0 | 60 | 970 |

Results and Discussion
Pressure-Retarded Osmosis Results

FIG. 5 compares water flux and power density results (symbols) with model results (lines). The maximum hydraulic pressure differential achieved using the conditions of this Example was 970 kPa. Recorded data closely matched the model predictions.

At a pressure of 970 kPa, the water fluxes achieved were between $1.8 \times 10^{-6}$ and $2.8 \times 10^{-6}$ m/s for the 35 g/L NaCl draw solution and between $3.6 \times 10^{-6}$ and $5.2 \times 10^{-6}$ m/s for the 60 g/L NaCl draw solution, depending on feed solution concentrations. These flux values are well above results previously reported in the literature, likely due to the improved membrane and membrane module used in the current investigation. The power densities achieved in this Example (FIG. 5) were up to 2.7 W/m$^2$ for a 35 g/L NaCl (2,763 kPa) draw solution and up to 5.1 W/m$^2$ for a 60 g/L NaCl (4,882 kPa) draw solution. In order to compare these values with those previously reported in the literature, a normalized power density value which takes into account the draw solution concentrations and hydraulic pressures used in previous investigations, was calculated ($W/(\Delta\pi - \Delta P)$). From Table 3 (last column) it can be seen that the normalized power density values from this Example are well above results previously reported in the literature.

TABLE 3

Comparison between power density results from the literature and from the Example discussed above.

| Source | $\Delta\pi$ | $\Delta P$ | $J_w$ $10^{-6}$ m/s | W W/m$^2$ | $W/(\Delta\pi - \Delta P)$ $10^{-3}$ W/m$^2 \times$ kPa |
|---|---|---|---|---|---|
| a | 2,533 | 1,216 | 0.29 | 0.35 | 0.27 |
| b | 10,132 | 1,925 | 0.81 | 1.56 | 0.19 |
| c | 8,106 | 4,053 | 0.81 | 3.27 | 0.81 |
| d | 7,802 | 4,053 | 0.77 | 3.12 | 0.83 |
| Example | 2,763 | 972 | 2.81 | 2.72 | 1.52 |
| Example | 4,882 | 972 | 5.21 | 5.06 | 1.30 | a Loeb, et al., Journal of Membrane Science 1: 249-269 (1976).
b Loeb, et al., Journal of Membrane Science, 4: 351-362 (1979).
c Mehta, et al., Journal of Membrane Science, 4: 335-349 (1979).
d Mehta, et al., Journal of Membrane Science, 4: 261-265 (1978).

Furthermore, in the present Example, the pressure was directly measured and found negligible due to the small size of the module itself. Practically, the pressure drop along the membrane module is a function of the flow hydraulics of the system and is preferably taken into consideration using appropriate correlations in order to minimize its magnitude.

Accordingly, the various embodiments disclosed herein can provide significant advantages over conventional systems. In at least some embodiments described herein, the osmotically assisted desalination systems and methods utilize a high-pressure membrane desalination process (e.g., a reverse osmosis (RO)) that in combination with a pressure-retarded osmosis (PRO) subsystem achieves water desalination at lower energy expenditure. Additional benefits can include high-efficiency impaired water treatment, reduced discharge of pollutants to the environment, and complete separation between impaired water and saline/seawater. As described above, the PRO subsystem can utilize semi-permeable membranes (submerged or enclosed) to treat impaired water while harvesting the chemical potential energy difference between saline water and impaired water. For example, the PRO process can be used in conjunction with a seawater desalination process (e.g., RO) in order to recover the chemical energy associated with the brine and therefore to reduce the energy requirement of the desalination process and to increase the efficiency of the PRO process itself.

In certain embodiments, treated wastewater, or other source of impaired water, can be used as an energy source that is manifested during mixing with a concentrated brine (draw solution) before ultimate discharge of the mixture to a location, such as discharge of the mixture back into the ocean. In addition, external energy can be provided to power a booster pump and, in some cases, is not required for pumping water from a low atmospheric pressure to the ultimate target pressure as in some conventional RO systems. Thus, at least in some embodiments, energy can be supplied by two or more pressure exchangers to convert the osmotic pressure difference in the osmotically assisted desalination to hydraulic pressure in the desalination process. The draw solution can optionally be used in a completely open loop to reduce accumulation of contaminants in the system.

Also, in at least some embodiments, the brine generated during the desalination process can be diluted in the PRO process and therefore can be discharged back to a source at the same or similar ambient concentration. This ability can mitigate adverse environmental impact on marine ecology/habitat if brine is discharged back to a natural source, such as an ocean. Furthermore, since the brine can be mixed with purified water from the PRO process, the diluted brine can be discharged at higher water quality compared to the ambient seawater. Accordingly, the disclosed systems and processes can achieve advanced and high-level wastewater treatment of a wide range of waste streams.

From an energy standpoint, in at least some embodiments disclosed herein, the osmotic pressure difference between the draw solution (generated by the desalination process) and the wastewater is a primary (or, in some embodiments, the only) source of hydraulic pressure that is used in the desalination process to overcome the osmotic pressure of the feed water to the desalination process. Therefore, the net energy demand of the RO process can be primarily used for producing purified water instead of to overcome the osmotic pressure of the feed water to the desalination process. Accordingly, the OAD systems and methods described herein can provide water recovery at reduced energy expenditures.

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. A water treatment method comprising:
    passing a first solute stream through a low pressure inlet of a first pressure exchanger to produce a pressurized first solute stream;
    passing the pressurized first solute stream through a booster pump and through an inlet of a pressure desalination unit to produce a stream of desalinated water and a pressurized concentrate stream;
    passing the pressurized concentrate stream into a high pressure inlet of the first pressure exchanger to produce a depressurized concentrate stream, wherein the pressure from the pressurized concentrate stream is transferred to the first solute stream to produce the pressurized first solute stream;
    passing the depressurized concentrate stream into a draw solution side of a pressure-retarded osmosis unit;

passing a stream of impaired water into a feed side of the pressure-retarded osmosis unit, wherein water from the impaired water crosses a membrane in the pressure-retarded osmosis unit and enters and pressurizes the depressurized concentrate stream, producing a pressurized diluted draw solution stream;

passing the pressurized diluted draw solution stream through a high pressure inlet of a second pressure exchanger;

passing a second solute stream through a low pressure inlet of the second pressure exchanger, wherein pressure from the pressurized diluted draw solution stream is transferred to the second solute stream to produce a pressurized second solute stream and a depressurized diluted draw solution stream; and passing the pressurized solute stream through the inlet of the pressure desalination unit.

2. The method of claim 1, wherein the first solute stream comprises seawater.

3. The method of claim 1, wherein the first solute stream comprises brackish water.

4. The method of claim 1, wherein the second solute stream comprises seawater.

5. The method of claim 1, wherein the second solute stream comprises brackish water.

6. The method of claim 1, wherein the first and second solute streams come from the same source.

7. The method of claim 1, wherein the first and second solute streams comprise seawater.

8. The method of claim 1, wherein the desalinated water is portable water.

9. The method of claim 1, wherein water from the impaired water is not incorporated into the desalinated water.

10. The method of claim 1, wherein the pressure desalination unit is a reverse osmosis unit.

11. A desalination system comprising:
a first pressure exchanger having a high pressure inlet, a low pressure inlet, a high pressure outlet, and a low pressure outlet;
a pressure-retarded osmosis unit having a feed inlet, a feed outlet, a draw solution inlet, and a draw solution outlet, the draw solution inlet coupled to the low pressure outlet of the first pressure exchanger;
a second pressure exchanger having a high pressure inlet, a low pressure inlet, a high pressure outlet, and a low pressure outlet, the high pressure inlet coupled to the draw solution outlet of the pressure-retarded osmosis unit;
a booster pump having an inlet and an outlet, the inlet coupled to the high pressure outlet of the first pressure exchanger; and
a pressure desalination unit having an inlet and an outlet, the inlet coupled to the outlet of the booster pump and the high pressure outlet of the second pressure exchanger.

12. The system of claim 11, wherein the pressure desalination unit is a reverse osmosis unit.

13. The system of claim 11, further comprising a saline water source coupled to the low pressure inlet of the first pressure exchanger.

14. The system of claim 11, further comprising a saline water source coupled to the low pressure inlet of the second pressure exchanger.

15. The system of claim 11, further comprising a source of impaired water coupled to the feed inlet of the pressure-retarded osmosis unit.

16. A water treatment method comprising:
Pressurizing a first solute stream;
Removing solutes from the pressurized first solute stream using a pressure desalination unit, producing a pressurized concentrate stream;
Depressurizing the pressurized concentrate stream, producing a depressurized concentrate stream;
Wherein pressurizing of the first solute stream and the depressurizing of the pressurized concentrate stream comprise providing a first pressure exchanger with a low pressure inlet, a high pressure outlet, a high pressure inlet, and a low pressure outlet, delivering the first solute stream into the low pressure inlet and out the high pressure outlet of the first pressure exchanger, and delivering the pressurized concentrate stream into the high pressure inlet and out the low pressure outlet of the first pressure exchanger;
Diluting and pressurizing the depressurized concentrate stream by passing the depressurized concentrate stream through a draw solution side of a pressure retarded osmosis unit, producing a diluted pressurized draw solution stream;
Using pressure in the diluted pressurized draw solution stream, pressurizing a second solute stream to produce a pressurized second solute stream;
Wherein pressurizing of the second solute stream comprises providing a second pressure exchanger with a low pressure inlet, a high pressure outlet, a high pressure inlet, and a low pressure outlet, delivering the second solute stream into the low pressure inlet and out the high pressure outlet of the second pressure exchanger, and delivering the diluted pressurized draw solution stream into the high pressure inlet and out the low pressure outlet of the second pressure exchanger; and
Removing solutes from the pressurized second solute stream using said pressure desalination unit.

* * * * *